April 26, 1927.
H. V. ATWELL
SEAL
Filed Nov. 2, 1925
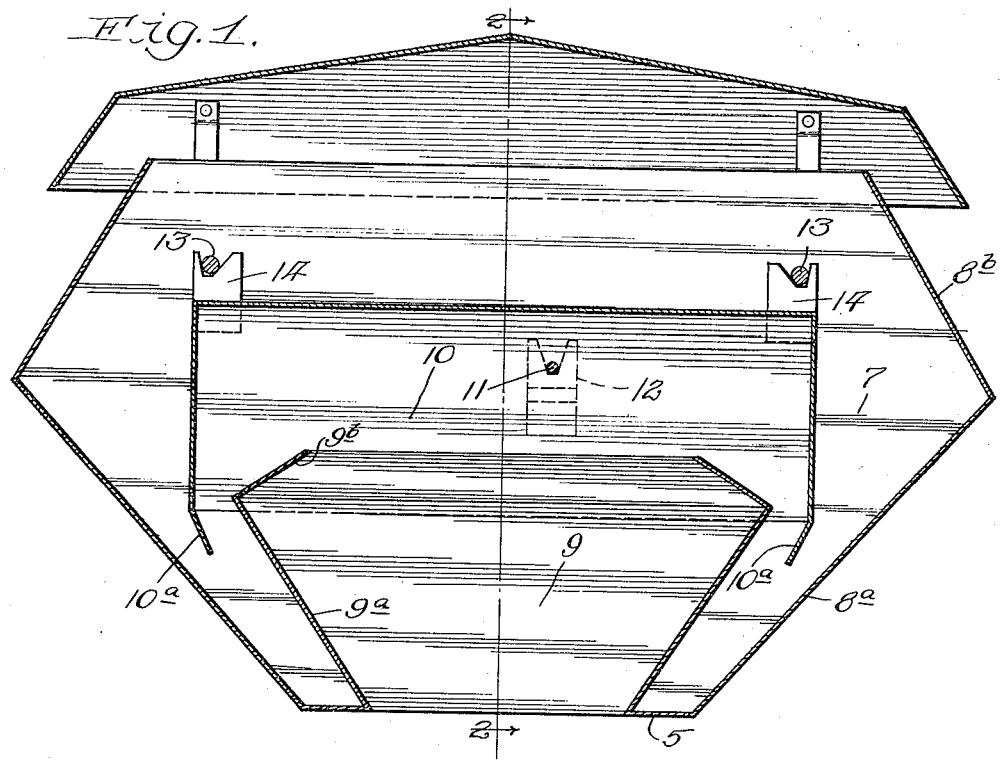
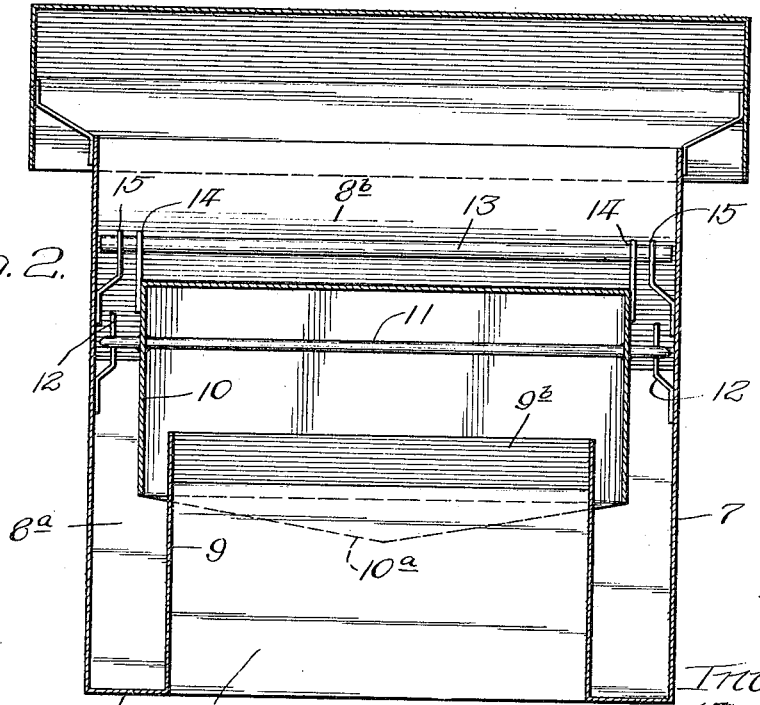

Patented Apr. 26, 1927.

1,626,443

UNITED STATES PATENT OFFICE.

HAROLD V. ATWELL, OF WHITING, INDIANA, ASSIGNOR TO STANDARD OIL COMPANY, OF WHITING, INDIANA, A CORPORATION OF INDIANA.

SEAL.

Application filed November 2, 1925. Serial No. 66,245.

The present invention relates to improvements in seals or vent valves, more particularly intended to be applied to the vent pipes of storage tanks containing gasoline or other volatile liquids. It is an improvement upon the seals or vent valves described in my prior Patent 1,529,682 of March 17, 1925.

The present invention will be more fully understood from the following description illustrated by the accompanying drawing, in which:

Figure 1 is a longitudinal sectional view through a device embodying the invention; and Fig. 2 is a transverse sectional view along the line 2—2 of Fig. 1.

Referring more particularly to the drawings, the numeral 5 indicates a pan or receptacle adapted to contain a sealing liquid, such as calcium chloride solution, glycerine or the like. As shown, the sides 7 of this pan are substantially parallel. The ends 8 diverge outwardly at the lower portion of the pan, as at 8ª, the upper portion being tapered inwardly as at 8ᵇ, thus forming an inwardly turned portion in the upper part of the pan. Within the pan and extending upwardly from its bottom there is provided the vent opening 9, open at both bottom and top and formed in a generally similar manner to the pan 5; that is, its sides are parallel and its ends diverge outwardly as at 9ª for a portion of their height and are converged inwardly as 9ᵇ for the remainder thereof.

Above the vent opening 9 the inverted cup 10 is mounted. The cup 10 is provided with a pivot rod 11, the ends of which extend beyond the sides of the cup 10 and rest in brackets 12 secured to the side walls of the pan 5. As pointed out in my prior patent above referred to, the inverted cup 10 is of such construction that its center of area is not aligned with its pivot point, but at one side thereof. The inverted cup is suspended at its center of gravity or in vertical alignment therewith, and consequently differences of pressure between the tank with which the vent opening 9 is connected and the atmosphere cause a tilting of the inverted cup 10. The force required to tilt a cup is, in the construction of this invention, predetermined by weights in the form of rods 13. Each of the rods 13 is supported by aligned supporting brackets 14 and 15 mounted near an end of the cup 10 and on the side walls of the pan 5 respectively. It is thus apparent that when an end of the inverted cup 10 is raised by a difference in pressure between the space communicating with the vent opening 9 and the atmosphere, the rod 13 at the end of the pan which is raised is lifted thereby, and its weight supported by the cup, whereas the descending end of the cup deposits the other rod in the corresponding brackets 15 mounted on the side walls of the pan 5. It is thus apparent that the weights are supported by the rising end of the cup in its tilting movement, but exert no action upon the descending end of the cup.

As shown in the drawing, the lower portions 10ª of the ends of the cup 10, which are tapered, as shown in dotted lines in Fig. 2, may be inwardly turned to enable them to move freely within the space between the outwardly diverging end walls of the pan 7 and the vent opening 9.

Above the pan 5 there is provided a suitable cover member 16 supported by the brackets 17. The cover is preferably of a form to facilitate drainage from its upper surface, and its lower margins are preferably below the level of the top of the pan 5, and spaced laterally therefrom, thereby hindering ingress of dirt, dust and the like thereinto.

The outwardly diverging portions of the end walls of the vent opening 9 and of the pan 5 are so constructed as to permit free movement of the end walls of the inverted cup 10 when the latter tilts. By constructing them in the manner hereinbefore described, a relatively small quantity of sealing liquid is adequate. The inwardly converging upper portions 8ᵇ of the walls of the pan 5 substantially prevent loss of sealing liquid by entrainment by the gas or vapor passing therethrough and, by raising the vent to the atmosphere from the seal to a substantial distance above the tilting inverted cup, prevent the latter from becoming inoperative as a result of fire. The inwardly converging portions of the walls of the vent conduit 9 substantially hinder the entrainment of foreign fluids which might otherwise be carried into the sealing liquid.

Although my invention has been shown and described in connection with a specific embodiment thereof, it is not intended that the specific details of this embodiment shall be regarded as limiting the scope of this invention.

I claim:

1. A seal comprising an open conduit member having outwardly diverging walls, a pan surrounding said conduit member and provided also with outwardly diverging walls, an inverted cup over said conduit member, said cup having its center of area offset from its center of gravity, means for pivotally supporting said cup in alignment with its center of gravity, the lower ends of the walls of said cup being adapted to enter the space between the adjacent diverging walls of the conduit member and the pan.

2. A seal comprising a conduit member provided with a vent opening, a pan surrounding said conduit member and adapted to contain a liquid, said pan having walls diverging outwardly at their lower portions and converging inwardly at their upper portions, an inverted cup tiltably mounted over said opening, said cup having its center of area offset from its center of gravity, and means for pivotally supporting said cup in alignment with its center of gravity.

3. A seal comprising a conduit member provided with a vent opening and having walls the lower portions of which diverge outwardly and the upper portions of which converge inwardly, a pan surrounding said conduit member, said pan likewise having walls the lower portions of which diverge outwardly and the upper portions of which converge inwardly, an inverted cup tiltably mounted over said vent opening, its sides being movable into and out of the spaces between the outwardly diverging walls of the conduit member and the pan, said inverted cup being tiltable by differentials in pressure between the vent opening and the external atmosphere.

4. A seal comprising a conduit member provided with a vent opening, a pan surrounding said conduit member and adapted to contain a liquid, said pan having walls diverging outwardly at their lower portions and converging inwardly at their upper portions, an inverted cup tiltably mounted over said opening, said cup having its center of area offset from its center of gravity, and means for pivotally supporting said cup in alignment with its center of gravity, the walls of the pan extending for a substantial distance above the cup.

HAROLD V. ATWELL.